(12) United States Patent
Ukai et al.

(10) Patent No.: US 8,197,143 B2
(45) Date of Patent: Jun. 12, 2012

(54) SLIDING BEARING FOR INTERNAL COMBUSTION ENGINES

(75) Inventors: Tomohiro Ukai, Inuyama (JP); Atsushi Okado, Inuyama (JP); Osamu Ishigo, Inuyama (JP)

(73) Assignee: Daido Metal Co., Ltd., Nagoya (JP)

( * ) Notice: Subject to any disclaimer, the term of this patent is extended or adjusted under 35 U.S.C. 154(b) by 531 days.

(21) Appl. No.: 12/422,641

(22) Filed: Apr. 13, 2009

(65) Prior Publication Data

US 2009/0257695 A1  Oct. 15, 2009

(30) Foreign Application Priority Data

Apr. 14, 2008 (JP) .................................. 2008-104532

(51) Int. Cl.
*F16C 33/10* (2006.01)

(52) U.S. Cl. ........................................ 384/288; 384/291

(58) Field of Classification Search .................. 384/288, 384/291, 294

See application file for complete search history.

(56) References Cited

FOREIGN PATENT DOCUMENTS

| JP | 04-219521 A | 8/1992 |
|----|-------------|--------|
| JP | 08-277831 A | 10/1996 |
| JP | 2005-76755 A | 3/2005 |
| JP | 2006-144913 A | 6/2006 |

*Primary Examiner* — William C Joyce

(74) *Attorney, Agent, or Firm* — Browdy and Neimark, PLLC (57) ABSTRACT

A sliding bearing has a pair of semi-cylindrical bearings assembled together to form a cylindrical configuration. At least one of the semi-cylindrical bearings is provided with an inner surface circumferentially extending oil groove extending a central portion of the circumferential length of the semi-cylindrical bearing. A bottom surface of the oil groove has an ups and downs form consisting of a plurality of ridges and valleys, which sinusoidally undulate consecutively without a flat portion therebetween. The dimensional relationship between a typical ridge and the adjacent valleys is defined by the formula h<0.15H where H indicates the groove depth and h indicates an elevation difference of the ups and downs of the bottom surface, namely a height of the ridges where h is preferably not less than 10 μm.

6 Claims, 5 Drawing Sheets

PRIOR ART

FIG.8

PRIOR ART

FIG.9

PRIOR ART

FIG.10

PRIOR ART

SLIDING BEARING FOR INTERNAL COMBUSTION ENGINES

CROSS-REFERENCE TO RELATED APPLICATION

The present application claims priority from Japanese patent application Ser. No. 2008-104532 filed on Apr. 14, 2008, the content of which is hereby incorporated by reference into this application.

TECHNICAL BACKGROUND OF THE INVENTION

The present invention relates to a sliding bearing for internal combustion engines, the sliding bearing consisting of a pair of semi-cylindrical bearings which are assembled to each other so as to support a crankshaft.

Conventional sliding bearings for crankshafts have been fabricated by mating two semi-cylindrical bearings with each other so as to form a cylindrical configuration. A circumferential oil groove is provided on an inner surface of at least one of the pair of semi-cylindrical bearings, and lubricant oil is fed to an outer surface of a crankpin through the circumferential oil groove. In general, the circumferential oil groove has a constant depth (see JP-A-8-277831).

On the other hand, in order to reduce the quantity of a lubricant oil leakage from ends of the sliding bearing according to downsizing of oil pumps for supplying a lubricant oil, a particular sliding bearing has been used in recent years, in which sliding bearing a constricted portion is provided to a circumferential oil groove so as to decrease the cross-sectional area of the circumferential oil groove toward the ends of the semi-cylindrical bearings of the sliding bearing from a circumferential center region of the respective semi-cylindrical bearing, or alternatively an area reduction portion is provided to a circumferential oil groove by forming protrusions on a bottom of the circumferential oil groove between circumferential ends and an oil hole for lubricant-oil supply provided to the semi-cylindrical bearings, whereby enabling a lubricant oil supply pressure to decrease (see JP-A-4-219521, JP-A-2005-76755 and JP-A-2006-144913).

With regard to a lubricant oil supply to sliding bearings used in an internal combustion engine, the lubricant oil is fed from an outside of a main sliding bearing for a crankshaft to a circumferential oil groove formed on an inner surface of the main sliding bearing, to an inner sliding surface of the main sliding bearing, and to an inner sliding surface of a sliding bearing for a crankpin of the crankshaft.

When an internal combustion engine is run in, foreign substances remaining in a lubricant oil passage are apt to be mixed in the lubricant oil being supplied to the circumferential oil groove of the main sliding bearing. Herein the foreign substances mean metal chips produced during machining to form an oil passage in an engine block, a molding sand used when casting the engine block, and so on. The foreign substances are entrained by a lubricant oil flow upon rotation of the crankshaft and discharged together with the lubricant oil through clearances, such as portions of chamfers, so-called crash relieves, etc., formed at bearing circumferential ends in conventional sliding bearings for internal combustion engines. In internal combustion engines in recent years, however, an advance-movement inertial force (i.e. an advance-ment inertial force causing foreign substances to go straight in a circumferential direction) acting on the foreign substances, which are accompanied in the lubricant oil flow and have a larger specific gravity than the lubricant oil, has increased in magnitude due to a trend of a high rotational speed of the crankshaft, so that the foreign substances are not discharged from clearance portions at mating ends of a pair of semi-cylindrical bearings constituting the sliding bearing but caused to move into a bearing sliding surface region of the other semi-cylindrical bearing without an oil groove on the inner surface thereof, whereby the bearing sliding surface of the sliding bearing have been liable to be damaged by the foreign substances.

On the other hand, in order to reduce the quantity of a lubricant oil leak from the ends of the pair of the semi-cylindrical bearings, there are proposed sliding bearings, in which a constricted portion is provided to an oil groove at a circumferential end of a semi-cylindrical bearing (see JP-A-4-219521, JP-A-2005-76755, and JP-A-2006-144913). In evaluating these sliding bearings from the viewpoint of the foreign substances, there is a problem that a flowing rate of the lubricant oil increases in a downstream side of the constricted portion in a flow direction of the lubricant oil whereby the inertial force acting on foreign substances entrained in the lubricant oil flow further increases in magnitude resulting in an increase in occasion when the foreign substances move into a bearing sliding surface region.

BRIEF SUMMARY OF THE INVENTION

Thus, it is an object of the invention to provide a sliding bearing for internal combustion engines, having an excellent performance of discharging foreign substances.

Under such an object, according to the present invention, there is provided a sliding bearing for internal combustion engines, comprising a pair of semi-cylindrical bearings cylindrically assembled with each other to support a crankshaft, at least one of the semi-cylindrical bearings being provided with a circumferentially extending oil groove on an inner surface thereof, wherein the oil groove comprises a central portion of a circumferential length of the semi-cylindrical bearing, a bottom surface of the oil groove has an ups and downs form consisting of a plurality of ridges and a plurality of roots, which undulate consecutively without a flat portion, and the dimensional relationship between an optional ridge out of the plurality of ridges and the roots positioned adjacent to the optional root is defined by the formula h<0.15H where H indicates a groove depth defined by the inner surface of the semi-cylindrical bearing, namely a bearing sliding surface, and a depth of the roots, and h indicates a difference of the ups and downs of the bottom surface, namely a height of the ridges.

In a first embodiment of the invention, the height h of the ridges is not less than 10 μm.

In a second embodiment of the invention, the oil groove is formed over an entire circumferential length of the semi-cylindrical bearing on the inner surface of the semi-cylindrical. In a third embodiment of the invention, a circumferential length of the oil groove is smaller than an entire circumferential length of the semi-cylindrical bearing and at least one of both circumferential ends of the oil groove does not reach a circumferential end face of the semi-cylindrical bearing.

In a fourth embodiment of the invention, with respect to a groove depth defined by the inner surface of the semi-cylindrical bearing, namely a bearing sliding surface, and the roots on the bottom surface of the oil groove, the oil groove meets the formula $d_1 \leq d_0$ where $d_0$ indicates a groove depth (i.e. a depth of a root existing closest to a central position of a circumferential length of the semi-cylindrical bearing) at a center of a circumferential length of the semi-cylindrical bearing, and $d_1$ indicates another groove depth at both circumferential ends of the oil groove (i.e. a depth of a root existing closest to both the circumferential ends of the oil groove).

Operation:

By forming the bottom surface of the circumferential oil groove as an ups and downs surface which extends circumferentially and undulates consecutively, foreign substances entrained in the lubricant oil is caused to move circumferentially in a reduced speed whereby enabling the foreign substances to be discharged from the circumferential ends of the semi-cylindrical bearing together with the lubricant oil.

Since foreign substances entrained in the lubricant oil are primarily consisting of metal chips and/or a molding sand which has a larger specific gravity than that of the lubricant oil, they are caused to move, by a centrifugal force generated upon rotation of a crankshaft, so as to roll along the bottom surface in the oil groove. In the present invention, since the bottom surface of the circumferential oil groove is so formed to be an ups and downs surface consisting of a plurality of ridges and a plurality of roots which undulates consecutively without a flat portion, it is possible to reduce a moving speed of the foreign substances under a contact relationship among the foreign substances and the root and ridge portions in the oil groove. Particularly, in case of the foreign substances having a large size, which are liable to damage the sliding bearing, the larger the size, the more easily the foreign substances roll along the bottom surface of the oil groove by virtue of a centrifugal force, so that making the groove bottom to be the ups and downs surface enhances a speed reduction of the foreign substances. Consequently, the foreign substances reaching the circumferential end regions of the semi-cylindrical bearing are decelerated in a moving speed, whereby an inertial force causing the foreign substances to move straight circumferentially is made small in magnitude, so that the foreign substances can be well discharged from widthwise ends of the sliding bearing through clearances in the circumferential end regions of the semi-cylindrical bearing.

In order to provide a sufficient contact resistance to the foreign substances rolling along the bottom surface, an elevation difference (i.e. a height h of the ridges) of the ups and downs bottom surface of the oil groove is preferably not less than 10 μm.

Further, since the elevation difference h of the ups and downs surface is made less than 15% of the groove depth H whereby making a pressure change of the lubricant oil minimum, and the bottom surface is made to be the consecutive ups and downs surface whereby making a pressure change of the lubricant oil gradual, so that the lubricant oil flows smoothly in the oil groove.

If the elevation difference h of the ups and downs bottom surface of the oil groove is not less than 15% of the groove depth H, a lubricant oil flowing in the vicinity of the bottom surface of the oil groove is made turbulent so as not to flow smoothly in the oil groove, whereby a pressure loss arises in an internal combustion engine and a force acts on the foreign substances entrained in the lubricant oil in the oil groove to cause the foreign substances to float upwards, so that the foreign substances might penetrate to a region of the sliding surface of the sliding bearing.

Further, even in a sliding bearing having a constant groove depth H, or a sliding bearing in which a groove depth H is decreased from a center region toward circumferential ends of a semi-circular bearing whereby reducing a quantity of the lubricant oil leaking from widthwise ends in circumferential end regions of the semi-circular bearing, by making an elevation difference h of the ups and downs bottom surface of the oil groove less than 15% of a groove depth H, it is possible to reduce a moving speed of the foreign substances rolling along the bottom surface of the oil groove without affecting a lubricant oil flow whereby discharging the foreign substances from widthwise ends in circumferential end regions of the semi-circular bearing.

Herein below, with reference to the drawings, there will be provided a description of Embodiments of the present.

DETAILED DESCRIPTION OF THE INVENTION

Invention and Comparative Examples

Embodiment 1

Figure 1:
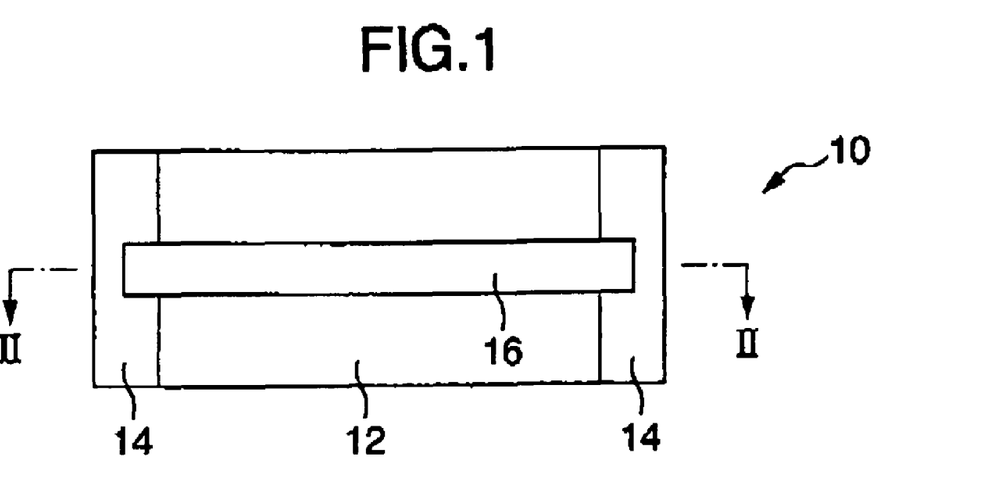
FIG. 1 is a view showing an inner surface of a semi-cylindrical sliding bearing according to Embodiment 1 of the invention.
Figure 2:
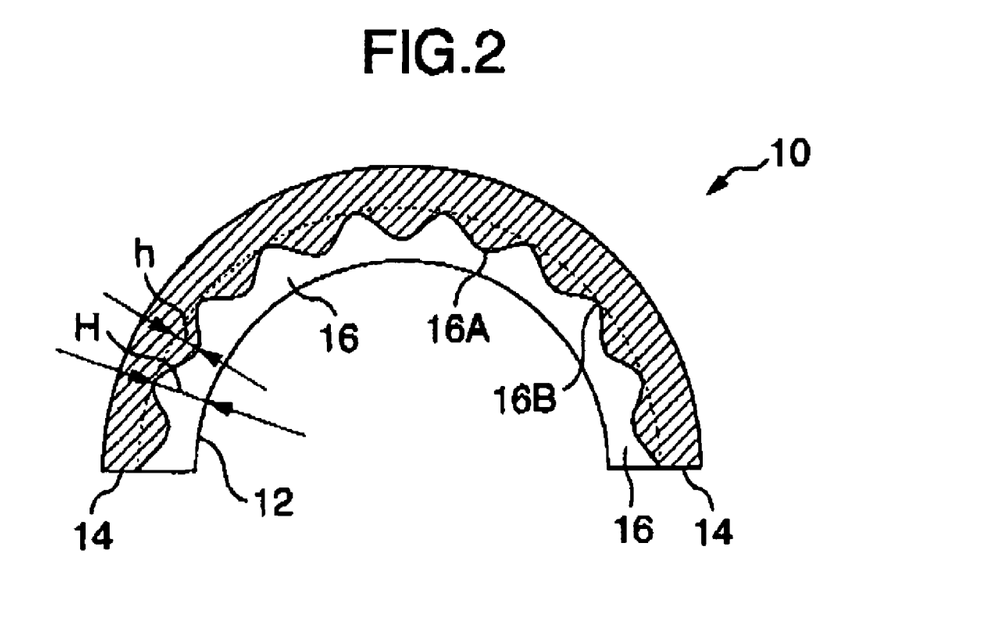
FIG. 2 is a cross sectional view taken along the line II-II in FIG. 1.

FIGS. 1 and 2 show a semi-cylindrical sliding bearing 10 as an Embodiment 1 of the invention. FIG. 1 is a view showing an inner surface of the sliding bearing 10, and FIG. 2 is a cross sectional view taken along the line II-II in FIG. 1. The sliding bearing 10 is assembled with another semi-cylindrical sliding bearing (not shown) by butting circumferential end faces of both the semi-cylindrical sliding bearings with one another so as to form a cylindrical body.

The sliding bearing 10 has a circumferentially extending oil groove 16 at a widthwise center of an inner surface (i.e. a bearing sliding surface) 12. The oil groove 16 is formed over the entire length of the inner surface to have groove ends opened at the both end faces 14. Further, a bottom surface of the oil groove 16 is of an ups and downs surface consisting of a plurality of ridges 16A and a plurality of roots 16B, which undulate consecutively without a flat portion. In the Embodiment, deepest portions of the plurality of roots 16B exist on an arc of a radius r about a bearing center (i.e. an axis).

Hereupon, H and h meet the following formula (1) where H (which is equal to a depth from the inner surface 12 to the deepest portions of the roots 16B) indicates a depth of the oil groove 16 with the inner surface (i.e. the bearing sliding surface) 12 as a reference surface, and h (which is constant in this Embodiment) indicates an elevation difference of the ups and downs surface, namely, a height of the ridges. Preferably, the height h of the ridges is made to be not less than 10 μm.

$$h < 0.15H \quad (1)$$

The sliding bearing 10 is formed in the manner described above. When using the sliding bearing 10, a lubricant oil is fed into the oil groove 16 through an oil hole, which is not shown and formed through a bearing wall, to flow circumferentially toward the end faces 14 in the oil groove 16. The ups and downs surface is formed so that an elevation difference (i.e. the height h of the ridges) of the ups and downs bottom surface of the oil groove 16 is preferably not less than 10 μm, and the ups and downs surface makes resistance to the foreign substances, which are brought into the oil groove together with the lubricant oil to roll along the ups and downs bottom surface of the oil groove, to reduce a moving speed of the foreign substances. Since the foreign substances reaching the circumferential ends of the bearing are small in moving speed, and an inertial force causing the foreign substances to go straight in a circumferential direction is small in magnitude, the foreign substances can be discharged successfully from widthwise ends of the bearing together with the lubricant oil.

Further, a pressure change of the lubricant oil can be made minimum when it flows along the root and ridge portions of the ups and downs surface by making the elevation difference of the ups and downs surface so as to meet the formula h<0.15H. And the lubricant oil flows smoothly in the oil groove by forming the bottom surface as a consecutive ups and downs surface to enable the pressure change of the lubricant oil gradual. In order to reduce a rolling speed of the foreign substances, the bottom surface of the circumferential oil groove is preferably so formed to have not less than six ups and downs (i.e. the ridges and the roots).

One Example of Specific Numerical Values

In case of a semi-circular sliding bearing having an inner diameter of 45 mm and provided with a groove having a groove depth H of 0.8 mm, an elevation difference (i.e. a height h of the ridges) is preferably not less than 10 μm and less than 0.12 mm The consecutive roots 16B or ridges 16A preferably have a pitch of a circular angle of not more than 36° so that the bottom surface of the circumferential oil groove is defined by not less than six ups and downs (i.e.: the ridges and the roots).

The oil groove 16 having the consecutive ups and downs bottom surface can be formed by means of a common method such as machining, press working, etc. In case of machining, formation is accomplished by moving a rotation axis center of a cut cutter in a manner to describe a locus corresponding to the ups and downs on the bottom. A groove depth H and a groove width dimension are determined by specifications of a bearing portion of an internal combustion engine in the same manner as in conventional sliding bearings and involve no specific restriction. Further, it is possible to form chamfered portions on sides of an oil groove in the same manner as in conventional sliding bearings.

Embodiment 2

Figure 3:
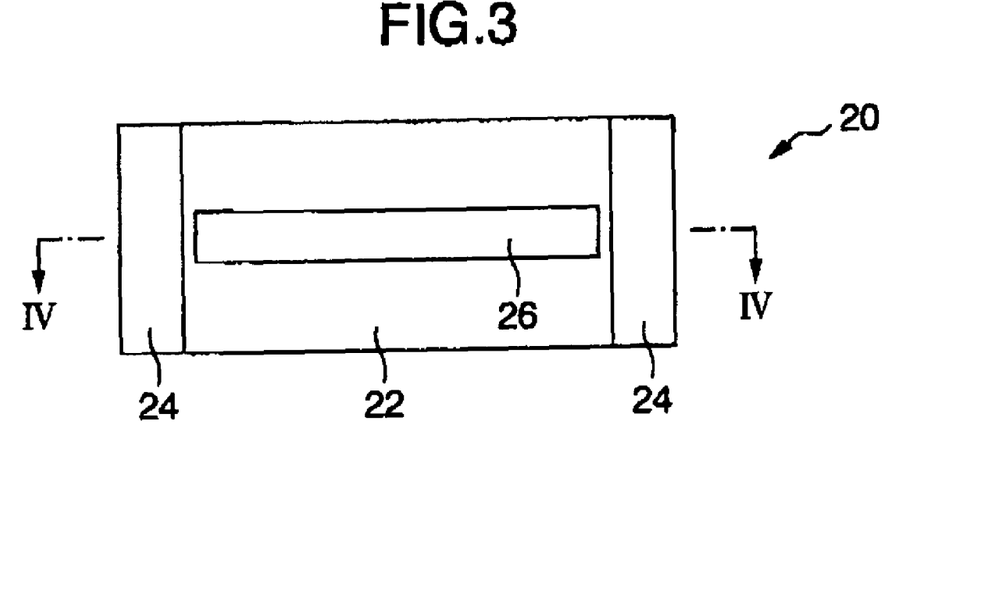
FIG. 3 is a view showing an inner surface of a semi-cylindrical sliding bearing according to Embodiment 2 of the invention.
Figure 4:
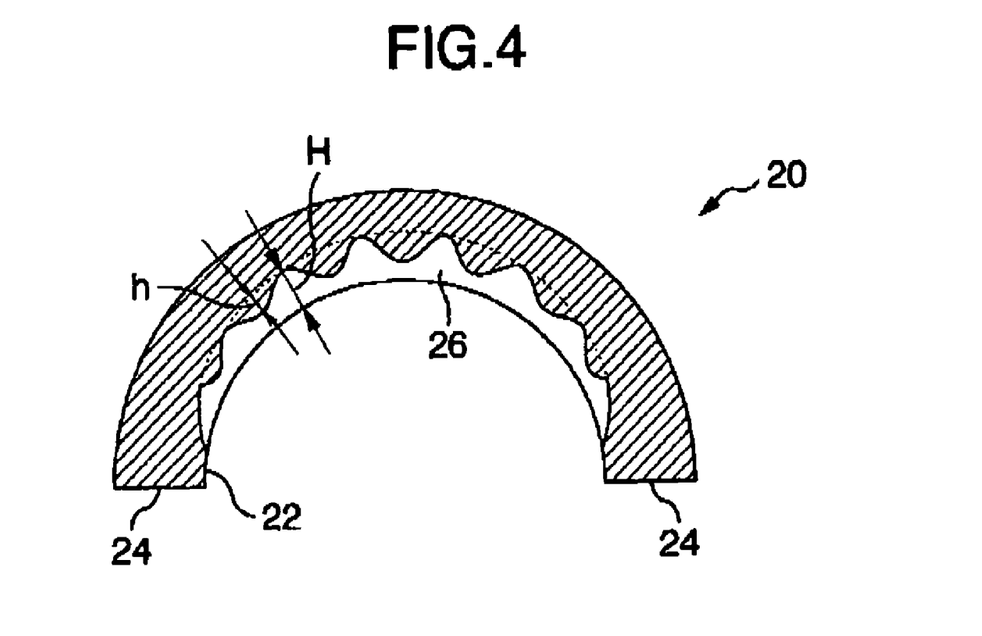
FIG. 4 is a cross sectional view taken along the line IV-IV in FIG. 3.

FIGS. 3 and 4 show a semi-cylindrical sliding bearing 20 as an Embodiment 2 of the invention. FIG. 3 is a view showing an inner surface of the sliding bearing 20, and FIG. 4 is a cross sectional view taken along the line IV-IV in FIG. 3. Like the sliding bearing 10, the sliding bearing 20 includes a circumferentially extending oil groove 26 at a widthwise center of an inner surface (bearing sliding surface) 22. Unlike the oil groove 16, the oil groove 26 is not formed over the entire length of the inner surface and groove ends are not opened at both end faces 24 of the bearing. In this manner, when a construction is adopted, in which the groove ends are not opened at the both end faces 24, the quantity of a lubricant oil leaking from the groove ends is reduced and foreign substances entrained by the lubricant oil are decreased in moving speed. Since the foreign substances reaching the circumferential ends of the bearing are small in moving speed and an inertial force causing the foreign substances to go straight is small in magnitude, the foreign substances can be discharged from the bearing widthwise ends together with the lubricant oil.

While the consecutive ups and downs surface of the bottom in the Embodiment is fundamentally the same in structure as the oil groove 16, it is different in structure from the oil groove 16 in that the oil groove 26 is not formed over the entire length of the inner surface, and a depth H of the oil groove 26 with the inner surface (i.e. the bearing sliding surface) 22 as a reference surface is maximum at a center of a circumferential length of the sliding bearing 20 and gradually decreases toward both groove ends. In this case, the relationship between the groove depth H and the ridge height h is such that the height h of an optional ridge in a circumferential direction of the bearing and a groove depth H of a root adjacent to the ridge meet the formula (I).

Embodiment 3

Figure 5:
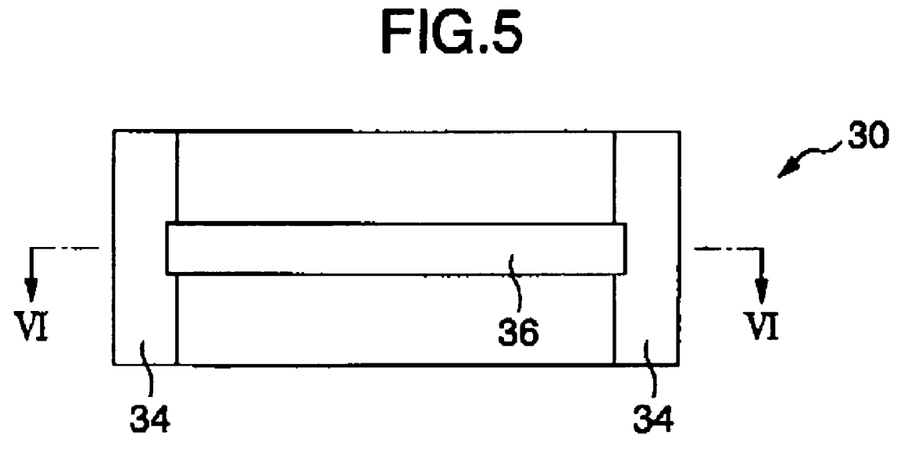
FIG. 5 is a view showing an inner surface of a semi-cylindrical sliding bearing according to Embodiment 3 of the invention.
Figure 6:
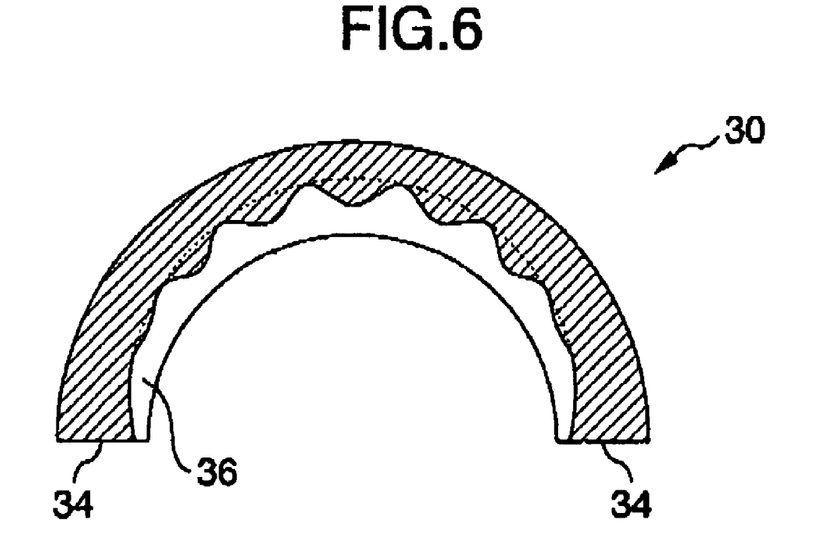
FIG. 6 is a cross sectional view taken along the line VI-VI in FIG. 5.

FIGS. 5 and 6 show a semi-cylindrical sliding bearing 30 as an Embodiment 3 of the invention. FIG. 5 is a view showing an inner surface of the sliding bearing 30 and FIG. 6 is a cross sectional view taken along the line VI-VI in FIG. 5. The sliding bearing 30 is substantially the same in oil groove structure as the sliding bearing 20 except that groove ends of an oil groove 36 are opened at both end faces 34 of the bearing. Since a groove depth H of the oil groove 36 is maximum at a center of a circumferential length of the sliding bearing 30 and gradually decreases toward the both groove ends, the quantity of a lubricant oil leaking from the groove ends is reduced and foreign substances entrained by the lubricant oil are decreased in moving speed. Since the foreign substances reaching the circumferential ends of the bearing are small in moving speed and an inertial force causing the foreign substances to go straight is small in magnitude, the foreign substances can be discharged from the bearing widthwise ends together with the lubricant oil.

While the three Embodiments of the invention have been described, it is permissible to form an ups and downs surface of a bottom, for which an elevation difference h of ups and downs is not less than 15% of a groove depth H, or a smooth bottom surface in regions near circumferential ends of an oil groove in the case where it is difficult to make an elevation difference of ups and downs of a bottom surface less than 15% of a groove depth H in relation to an accuracy of a working machine since a groove depth H in the vicinity of circumferential ends of an oil groove is very small in a sliding bearing formed with an oil groove, of which a groove depth H is decreased toward ends from a center in a circumferential direction of the bearing. However, such permissible regions are preferably within 15° from ends of a circumferential oil groove.

Further, the examples shown in the drawings are not limitative but the case where an end of a circumferential oil groove is opened only at a one end face of a bearing is possible, and a cross sectional shape of a bottom surface of an oil groove in a circumferential direction can be consisted of a single arc as shown in the Embodiments or a plurality of arcs.

In addition, the sliding bearing of the invention may involve thickness deviation so that the sliding bearing is decreased in thickness toward ends from a center in a circumferential direction of the bearing in the same manner as in conventional sliding bearings, or crash relief, or chamfer may be formed on sides of circumferential ends of a bearing toward an inner surface of the bearing.

Comparative Example 1

Figure 7:
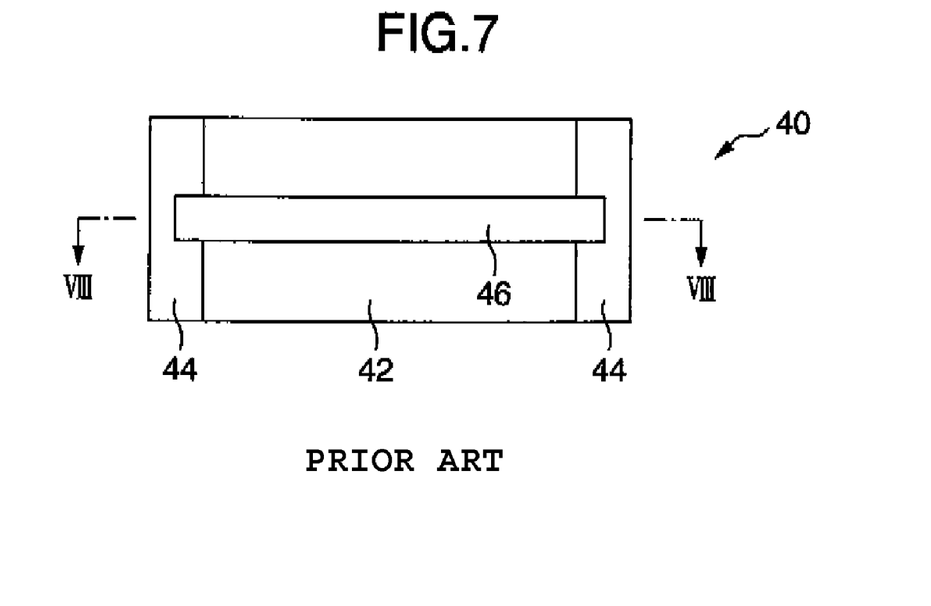
FIG. 7 is a view showing an inner surface of a known semi-cylindrical sliding bearing according to Comparative example 1.
Figure 8:
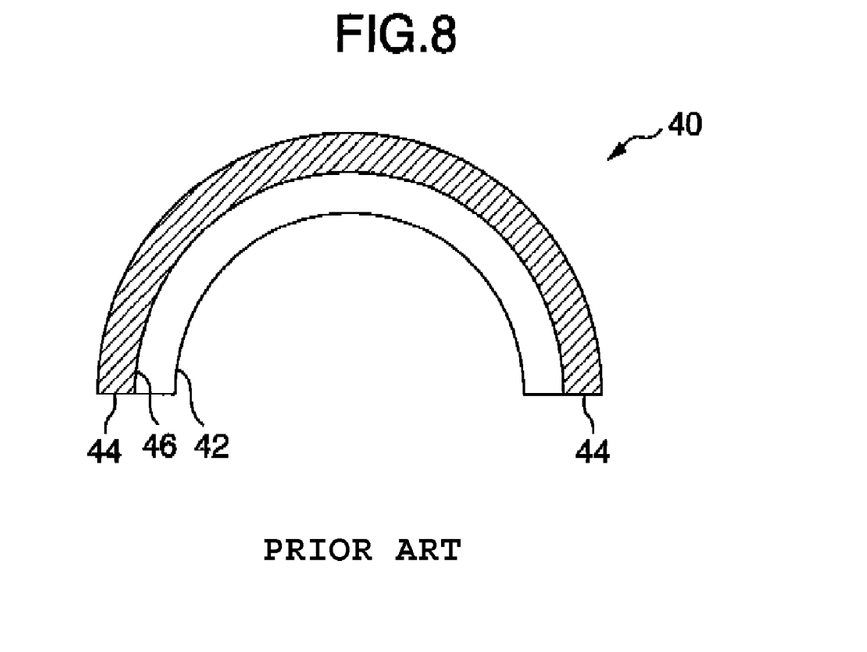
FIG. 8 is a cross sectional view taken along the line VIII-VIII in FIG. 7.

FIGS. 7 and 8 show a known, semi-cylindrical sliding bearing 40 according to Comparative example 1. FIG. 7 is a view showing an inner surface of the sliding bearing 40 and FIG. 8 is a cross sectional view taken along the line VIII-VIII in FIG. 7. The sliding bearing 40 includes a circumferentially extending oil groove 46 at a widthwise center of an inner surface (bearing sliding surface) 42. The oil groove 46 is formed over the entire length of the inner surface and groove ends are opened at both end faces 44 of the bearing. A bottom surface of the oil groove 46 is in the form of a flat surface (smooth surface) without undulation.

Comparative Example 2

Figure 9:
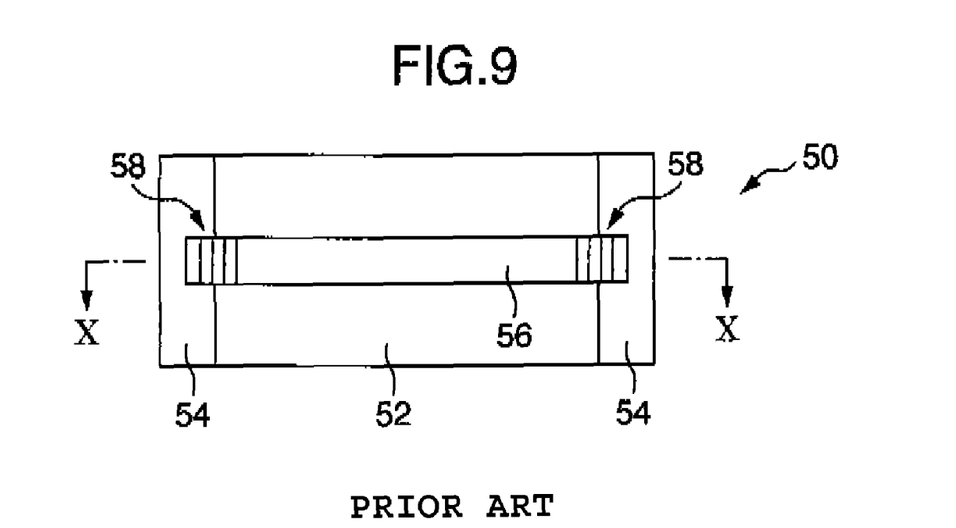
FIG. 9 is a view showing an inner surface of a semi-cylindrical sliding bearing according to Comparative example 2.
Figure 10:
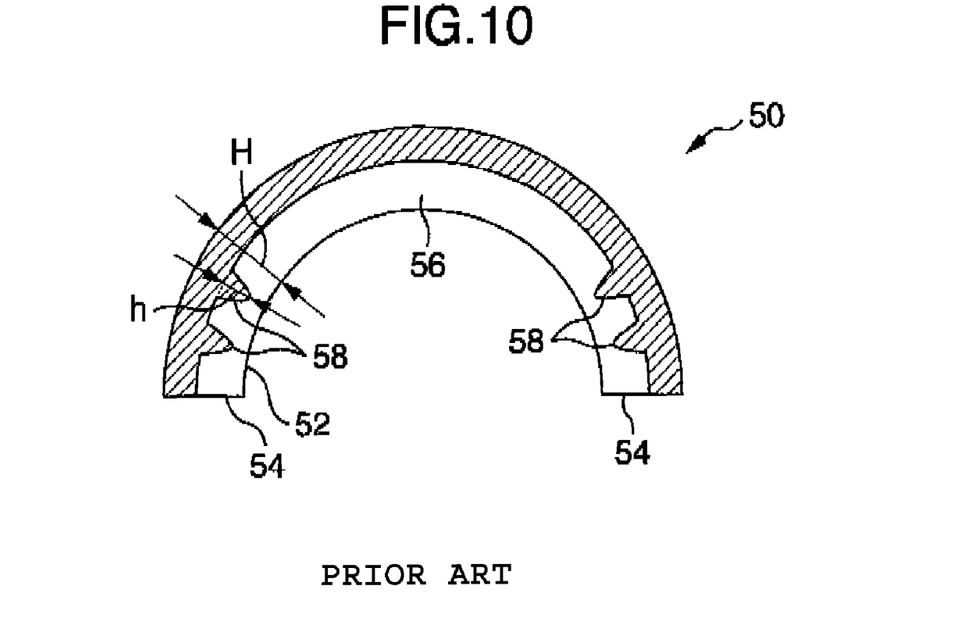
FIG. 10 is a cross sectional view taken along the line X-X in FIG. 9.

FIGS. 9 and 10 show a semi-cylindrical sliding bearing 50 according to Comparative example 2. FIG. 9 is a view showing an inner surface of the sliding bearing 50 and FIG. 10 is a cross sectional view taken along the line X-X in FIG. 9. The sliding bearing 50 includes a circumferentially extending oil groove 56 at a widthwise center of an inner surface (i.e. a bearing sliding surface) 52. The oil groove 56 is formed over the entire length of the inner surface and groove ends are opened at both end faces 54 of the bearing. A major part of a central region of a bottom surface of the oil groove 56 except both end portions of the groove is in the form of a flat surface (i.e. a smooth surface) without undulation like the oil groove 46 of Comparative example 1. A plurality of protuberant portions 58 having a height h amounting to 50% of a groove depth H are formed on a bottom surface of the oil groove 56 in both end regions of the groove, so that the groove is small there in cross-sectional area as compared with the remaining regions.

Comparison Among Embodiments 1 to 3 and Comparative Examples 1, 2

With regard to the Embodiments, a lubricant oil fed into the circumferential oil groove through the oil hole (not shown) provided on a wall of the bearing flows in the oil groove in a circumferential direction. A bottom surface of the oil groove is defined by an ups and downs surface preferably having an elevation difference of not less than 10 μm whereby the ups and downs surface makes resistance to foreign substances, which are mixed into the oil groove together with the lubricant oil to roll along the bottom surface of the oil groove, to decrease the foreign substances in moving speed. Since the foreign substances reaching the circumferential ends of the bearing are small in moving speed and an inertial force causing the foreign substances to go straight in a circumferential direction is small in magnitude, the foreign substances can be discharged together with the lubricant oil, which is discharged from widthwise ends of the bearing. Since an elevation difference h of the ups and downs surface is made less than 15% of a groove depth H, when flowing along the root portions and the ridge portions, the lubricant oil is made minimum in pressure change, and the bottom surface is defined by a consecutive, ups and downs surface to provide for a gentle change in pressure of the lubricant oil, the lubricant oil flows smoothly in the oil groove.

With regard to Comparative example 1, foreign substances mixed into the oil groove together with the lubricant oil roll along the bottom surface of the oil groove, but the bottom surface of the groove is smooth to make less resistance and so an effect of decreasing the foreign substances in moving speed is not produced. Therefore, an inertial force causing the foreign substances to go straight in a circumferential direction is large in magnitude, so that foreign substances reaching circumferential ends of the bearing are not discharged in a widthwise direction of the bearing but liable to be mixed into a bearing sliding surface portion of a mating semi-cylindrical sliding bearing (not shown).

With regard to Comparative example 2, a lubricant oil flowing in the oil groove in a circumferential direction undergoes a sudden and local change in pressure in the vicinity of the protuberant portions formed discretely on the bottom surface of the oil groove near circumferential ends of the bearing, so that the lubricant oil does not flow smoothly in the oil groove, thus causing a pressure loss. Further, since an effect of constriction increases the lubricant oil in flow velocity on a downstream side of the protuberant portions in a flow direction of the lubricant oil, the lubricant oil is also increased in moving speed. Therefore, an inertial force causing foreign substances to go straight in a circumferential direction is large in magnitude, so that foreign substances reaching the circumferential end faces of the bearing are not discharged in a widthwise direction of the bearing but liable to be mixed into a bearing sliding surface portion of a mating semi-cylindrical sliding bearing (not shown). Further, there is also caused a new problem that the protuberant portions cause the lubricant oil in the circumferential groove to undergo a sudden pressure change whereby foreign substances float in the lubricant oil and are made liable to be mixed onto a bearing sliding surface of the bearing itself with the protuberant portions.

The invention claimed is:
1. A sliding bearing for internal combustion engines, comprising
a pair of semi-cylindrical bearings cylindrically assembled with each other to support a crankshaft,
at least one of the semi-cylindrical bearings being provided with a circumferentially extending oil groove on an inner bearing sliding surface thereof,
wherein the oil groove comprises a central portion of a circumferential length of the semi-cylindrical bearing,
the circumferential oil groove having a bottom surface of the oil groove which has an up and down form of approximately a sinusoidal curve as a plurality of adjacent ridges and valleys, which undulate consecutively and repeatedly without a flat portion therebetween, and
the dimensional relationship between a ridge and an adjacent valley of the plurality of adjacent ridges and valleys is defined by the formula h<0.15 H where H indicates a depth of the circumferentially extending oil groove defined by the inner surface of the semi-cylindrical bearing sliding surface, and a depth of the valleys, and h indicates an elevation difference of the ups and downs of the bottom surface corresponding to a height of the ridges.
2. The sliding bearing according to claim 1, wherein the height h of the ridges is not less than 10 μm.

3. The sliding bearing according to claim 1, wherein the oil groove is formed over an entire circumferential length of the semi-cylindrical bearing on the inner surface of the semi-cylindrical bearing.

4. The sliding bearing according to claim 1, wherein a circumferential length of the oil groove is smaller than an entire circumferential length of the semi-cylindrical bearing, and at least one of both circumferential ends of the oil groove does not reach a circumferential end face of the semi-cylindrical bearing.

5. The sliding bearing according to claim 1, wherein with respect to a groove depth defined by the bearing sliding surface, and the on the bottom surface of the oil groove, the oil groove meets the formula $d_1 < d_0$ where $d_0$ indicates a groove depth at a center of a circumferential length of the semi-cylindrical bearing, and $d_1$ indicates a groove depth at both circumferential end regions of the oil groove.

6. A sliding bearing for internal combustion engines, comprising a pair of semi-cylindrical bearings cylindrically assembled with each other to support a crankshaft, at least one of the semi-cylindrical bearings being provided with a circumferentially extending oil groove on an inner bearing sliding surface thereof, wherein the oil groove comprises a central portion of a circumferential length of the semi-cylindrical bearing, the circumferential oil groove having a bottom surface of the oil groove which has an up and down form of approximately a sinusoidal curve as a plurality of adjacent ridges and valleys, which undulate consecutively and repeatedly without a non-undulating portion therebetween, and the dimensional relationship between a ridge and an adjacent valley of the plurality of adjacent ridges and valleys is defined by the formula $h < 0.15\, H$ where H indicates a depth of the circumferential extending oil groove defined by the inner surface of the semi-cylindrical bearing sliding surface, and a depth of the valleys, and h indicates an elevation difference of the ups and downs of the bottom surface corresponding to a height of the ridges.

* * * * *